United States Patent [19]

Cordes et al.

[11] Patent Number: 5,456,874
[45] Date of Patent: Oct. 10, 1995

[54] PROCESS FOR PRODUCING A GLAZING EQUIPPED WITH A PERIPHERAL FRAME BASED ON A POLYMER

[75] Inventors: Hans Cordes; Helmut Krumm; Ludwig Schwartz, all of Aachen; Ilan Kahn, Uebach-Palenberg; Gerd Cornils, Merzenich-Girbelsrath; Ulrich Behrend, Inden, all of Germany

[73] Assignee: Saint Gobain Vitrage International, Courbevoie, France

[21] Appl. No.: 241,235

[22] Filed: May 11, 1994

Related U.S. Application Data

[62] Division of Ser. No. 911,449, Jul. 10, 1992, Pat. No. 5,316,829.

[30] Foreign Application Priority Data

Jul. 13, 1991 [DE] Germany ............... 41 23 256.9

[51] Int. Cl.$^6$ ............................................. B29C 45/14
[52] U.S. Cl. ............... 264/138; 156/108; 156/244.18; 156/250; 264/252; 264/259; 264/263
[58] Field of Search ............................. 156/108, 109, 156/244.18, 250, 256; 264/138, 139, 252, 259, 263

[56] References Cited

U.S. PATENT DOCUMENTS

| | | | |
|---|---|---|---|
| 3,779,794 | 12/1973 | De Santis | 156/329 |
| 4,013,495 | 3/1977 | Golumbic | 156/256 |
| 4,561,929 | 12/1985 | Lenhardt | 156/106 |
| 4,704,175 | 11/1987 | Kunert et al | 156/108 |
| 4,854,636 | 8/1989 | Greenhalgh et al. | 296/201 |
| 4,933,032 | 6/1990 | Kunert | 156/108 |
| 4,993,774 | 2/1991 | Greenhalgh et al. | 296/201 |
| 5,057,265 | 10/1991 | Kunert et al. | 264/511 |
| 5,069,849 | 12/1991 | Wain | 264/138 |
| 5,108,526 | 4/1992 | Cornils et al. | 156/108 |
| 5,242,518 | 9/1993 | Riederer | 156/256 |
| 5,302,333 | 4/1994 | Capriotti et al. | 156/108 |

FOREIGN PATENT DOCUMENTS

| | | | |
|---|---|---|---|
| 0479677 | 4/1992 | European Pat. Off. . | |
| 63-290714 | 11/1988 | Japan | 264/138 |
| 1080271 | 8/1967 | United Kingdom | 264/252 |

Primary Examiner—Jay H. Woo
Assistant Examiner—Robert B. Davis
Attorney, Agent, or Firm—Pennie & Edmonds

[57] ABSTRACT

The invention describes a glazing equipped with an extruded profile on which or in place of which is cast a complement, which is connected to the profile. The procedure makes it possible to replace part of the profile which is difficult to produce by extrusion or to add to it foreign elements such as fastenings or various accessories.

8 Claims, 9 Drawing Sheets

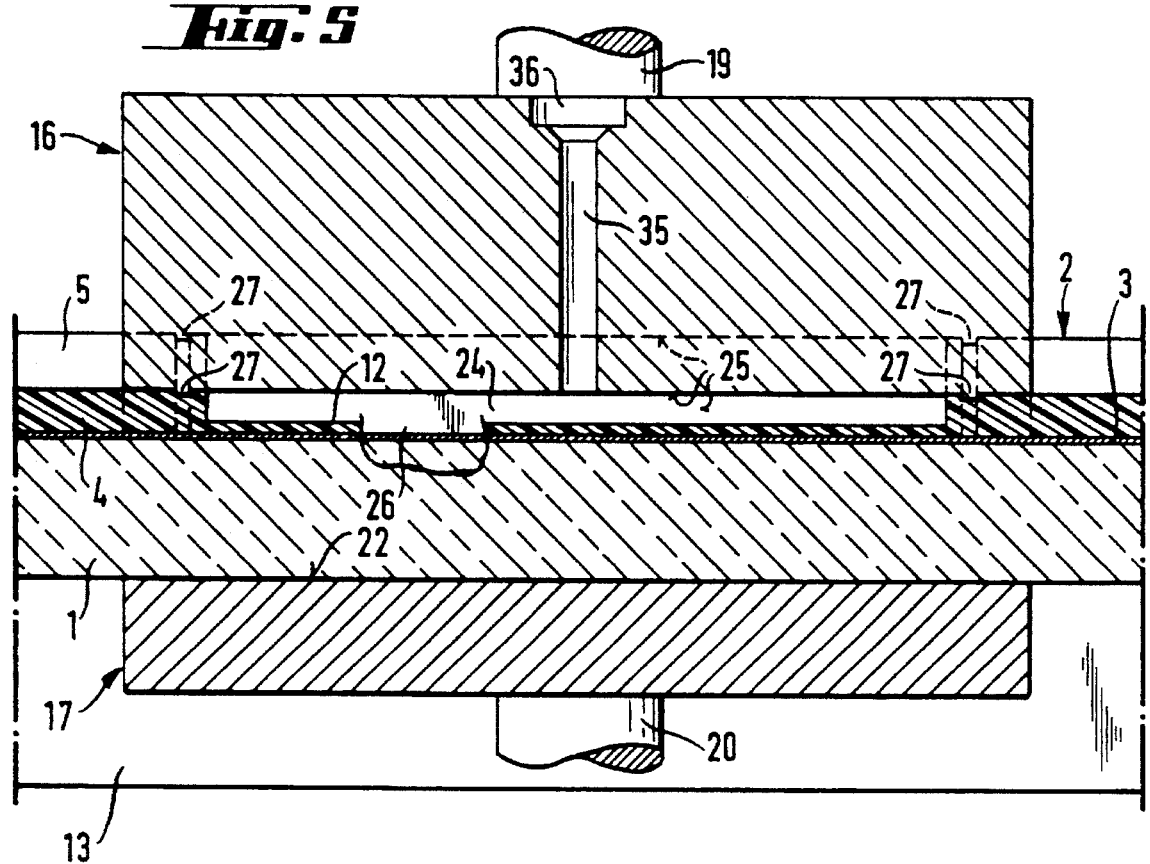
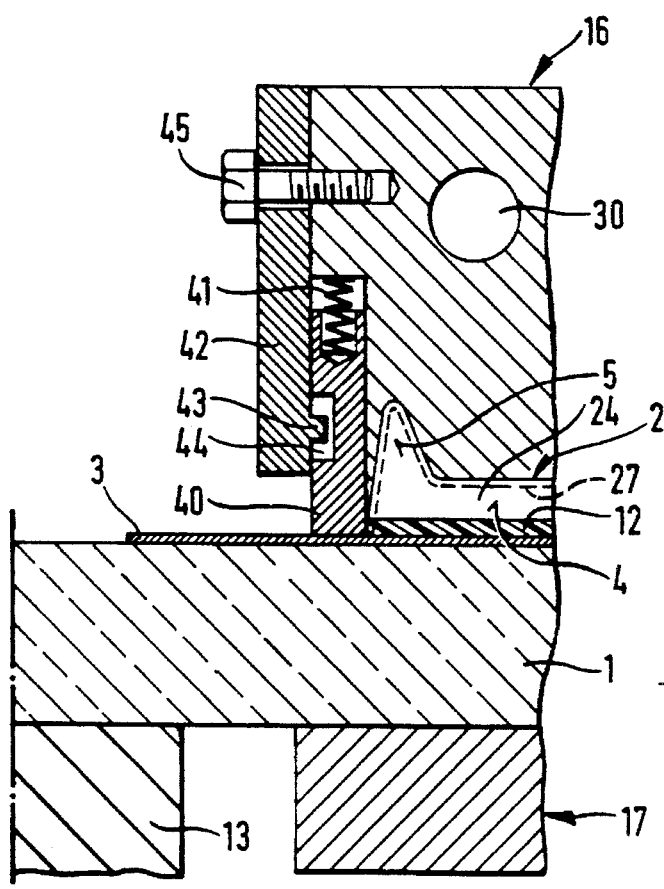

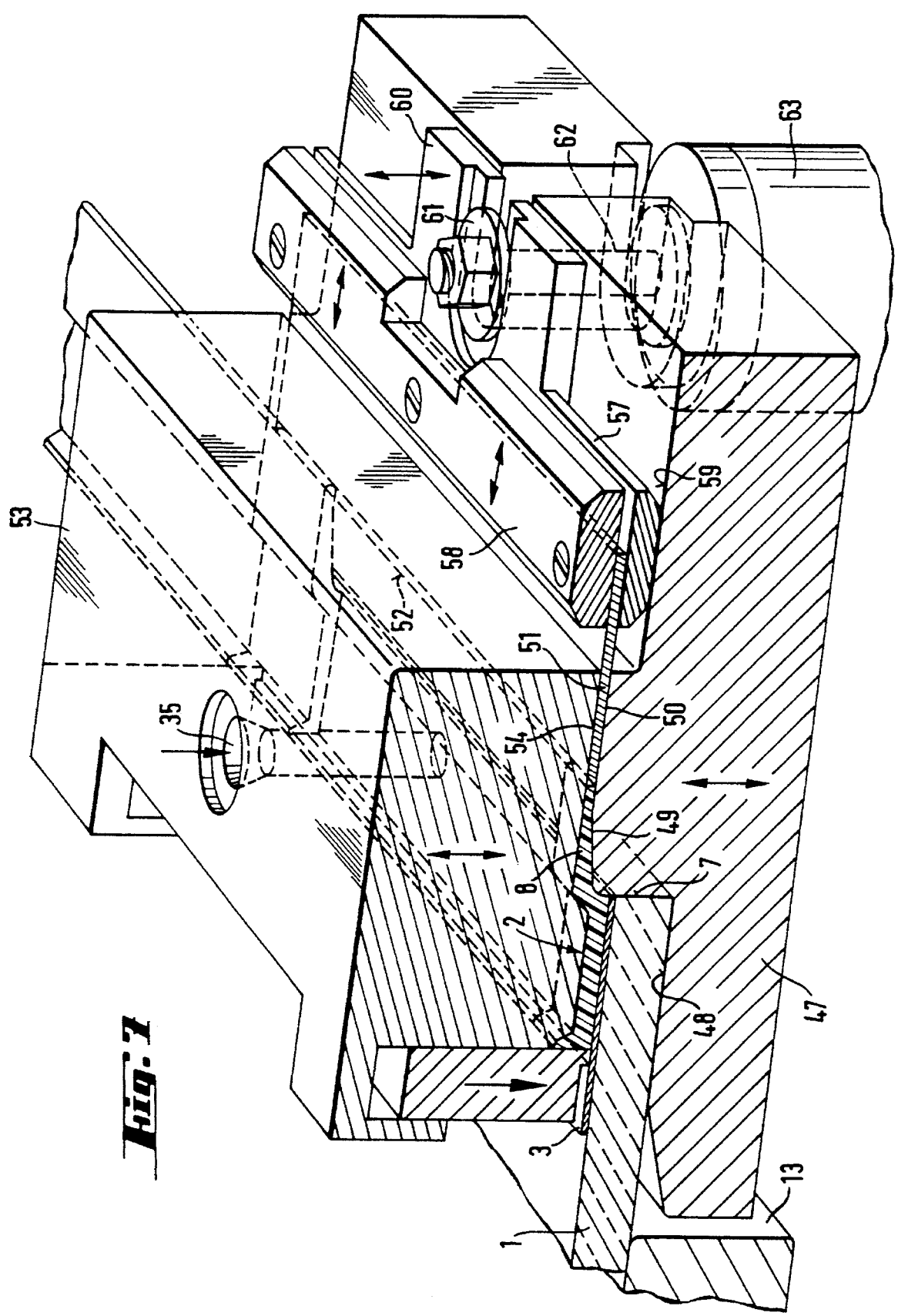

PROCESS FOR PRODUCING A GLAZING EQUIPPED WITH A PERIPHERAL FRAME BASED ON A POLYMER

This is a division of application Ser. No. 07/911,449, filed Jul. 10, 1992, and now U.S. Pat. No. 5,316,829.

FIELD OF THE INVENTION

The invention relates to a process for the production of a glazing provided on its periphery with a frame or a frame portion based on a polymer and essentially obtained by the extrusion of a profile with the aid of a nozzle or die calibrated directly to the periphery of the glazing, deposition taking place either directly on the glass, or on an opaque layer bonded to the glass, optionally also accompanied by the interposing of a primer. The invention also relates to the apparatus for performing the process.

BACKGROUND OF THE INVENTION

U.S. Pat. No. 5,057,265 describes a process of the aforementioned type for the production of a car glazing equipped with a profiled frame. This known process uses a calibrated extrusion nozzle, which is positioned on the edge of the glazing and then moved all along the perimeter, where it distributes the polymer. When the nozzle has returned to its starting point after covering the entire perimeter of the glazing in order to deposit the profile there, the supply of the polymer is interrupted and the nozzle moved away from the glazing. This method makes it possible to deposit a frame on the periphery of the glazing and in particular a frame having a lip extending towards the exterior. For this purpose it is merely necessary to use a polymer, whose high viscosity enables the profile to remain in place after depositing it.

In the process described hereinbefore the finishing of the frame, i.e. the connection area between the start and finish of the extrusion is performed in a second phase after the tool has been moved away from the glass, by using an appropriate shaping device which lays on the part in question in order to give it its final shape. Numerous different polymers have proved usable for this process, but normally use is made of a one-component polyurethane, which polymerizes in atmospheric humidity. It is also possible to use two-component polyurethanes.

At the end of pressing with the special tool as described in U.S. Pat. No. 5,057,265 it is found that in the connection zone between the start and finish of the extruded joint, excess material is left behind on the joint lip, which is necessary to cut after polymerizing the joint. This is a supplementary operation, which makes it necessary to handle the glazing again at the end of polymerization. Moreover, when the polymer quantity is not in excess in the manner described above, but is instead in a slight deficit, the situation may be that a material deficiency is noted more particularly on the generally thin lip which, in the case of a car glazing, can be prejudicial to its subsequent operation when the glazing is fitted in the car.

The extrusion procedure involving the in situ extrusion of a joint on the periphery of a glazing has numerous advantages. Particularly due to its flexibility, the in situ extrusion avoids the costs of very expensive moulds as are required in the encapsulation method known as reaction injection moulding (RIM). However, although profile variations are compatible with the in situ extrusion method (cf. e.g. U.S. Pat. No. 5,108,526 or EP-A-479,677), certain complicated shapes cannot be directly produced and in particular those extending beyond the periphery of the glazing. This is particularly the case when it is wished to incorporate other functions into the joint, because they often occupy a significant amount of space.

EP-A-255,218 describes a car glazing encapsulating RIM method, in which during the injection of the joint, various devices are incorporated which are used for functions other than those conventionally exercised by car glazing joints. These are, for example, in the form of a spoiler, a driving mirror, a stop light, electrical conductors, or are intended for the distribution of water, air, etc. The RIM method used involves a single stage, the accessories being placed alongside the glazing in the mould before the start of injection and are automatically inserted in the joint of the finished glazing. The problem of inserting accessories in the vicinity of a profile extruded in the periphery of a glazing is very different and it is impossible, particularly due to the cost or nature of the polymer, to think if using the RIM encapsulation method.

SUMMARY OF THE PRESENT INVENTION

The present invention aims at improving the glazing equipped with an in situ extruded profile by completing or supplementing said profile by a complement and improving the aforementioned peripheral extrusion process in such a way as to obtain a joint having any shape in certain areas of the extruded peripheral joint. It also aims at making it possible to obtain a joint having a regular profile, even in areas where extrusion cannot take place correctly, such as e.g. in connection areas between the start and the finish of the in situ extruded, peripheral profile.

The invention relates to a glazing, particularly a car glazing for bonding in the opening of a car body, which is equipped with an in situ extruded, peripheral profile having a polymer part completing or replacing the profile, whose shape it adopts at its junction therewith. The added part is either located in the transition area between the start and finish of the frame extruded on the glazing or in the corners of the glazing with acute angles or small radii. It also relates to car glazings having incorporated into the added part one or more of the devices selected in the group consisting of brake lights, electric power supplies such as for the heating of the glazing, antenna supply means, ducts for water or air, passages for windshield wiper shafts and fastenings.

According to the invention, a profile obtained by in situ extrusion of a polymer on the periphery of a glazing, optionally coated with an opaque layer, is provided with a complement having a clearly defined shape and connecting on either side of the profile. This is accomplished by placing a mould member that rests on the glazing and connecting it to the profile and by injecting into it a hardenable material, which adheres at least to the polymer. Before putting into place the mould member, it is possible to remove all or part of the polymer at the location of the projection. The polymer is removed after complete or partial hardening. Preferably, during the removal of the polymer at the location of the complement, a portion of the profile is left in place in contact with the glass or the opaque layer. The glazing according to the invention is intended to preferably equip a car opening and the profile participates in the installation of the glazing by bonding. In this case, the complement can include one or more foreign elements which are intended to provide a function other than that of the actual profile.

The polymer used for the in situ extrusion is a one-component polyurethane polymerizing with atmospheric humidity, or alternatively a two-component polyurethane. The hardenable material is preferably based on a one-component polyurethane, which is transformed into an elastomer under the action of heat.

The invention also relates to an apparatus having a two-part mould member with a cavity, whose shape corresponds to the shape desired for the complement and which is connected to the surface of the glazing and on either side of the complement to the extruded profile with an injection orifice linked with the cavity. Moreover, the upper and lower parts are provided with heating or cooling means. Preferably, the cavity is limited or bounded by sealing slats emerging from the surface of the mould, the sealing slats bearing on the glazing surface being mobile and operated by a spring.

Moreover, in the lower part of the mould member, the limit of the end of the lip of the profile is constituted by the end of a sliding plate sliding on the planar surface of the lower part. Advantageously, the sliding plate is equipped with jaws, which cooperate with a jack positioning the sliding plate in a position close to the lip. If it is a question of repairing the extruded profile after ablation in the corner area, the lower part of the mould member is preferably equipped with a plate cut with a contour limiting the corner of the lip, while the limits of the end of the lip on either side of the contour are constituted by the ends of sliding plates sliding on the planar surface of the lower part and which can bear on the one hand on the edge of the lip and on the other on the bearing surfaces of the cut plate.

The inventive procedure described hereinbefore has two different functions. On the one hand, it makes it possible to correct areas where the extruded profile is badly shaped, such as, for example, the connection area between the start and finish of the peripheral profile. It also makes it possible to add to a profile having a correct shape a part adding other characteristics thereto.

With regards to the method for correcting a defective profile, the invention makes it possible to act when the profile has already hardened. Therefore, the method is much less difficult than the conventional methods consisting of modelling the still soft profile with a risk of deforming adjacent areas having a satisfactory shape. In addition, on using a polymer which hardens relatively rapidly within the mould, there is a combination of the advantage of a very short production phase and the absence of any subsequent deformation of the part once it has been removed from the mould.

As far as the question of repairing the connection between the start and finish of a peripheral profile extruded in situ on the glazing is concerned, it is advantageous to cut the defective part following complete hardening, which leads to very clean cuts. However, for production reasons, it may be of interest to remove the defective area immediately following its deposition, i.e. before polymerization. A combination of the two methods is also possible, i.e. removal of most of the material when it is still pasty and cutting burrs after polymerization.

Both for the repairs to a defective profile and for creating a completely new complement or part, it is indispensable that the material used must be able to ensure a very good, durable adhesion to the remainder of the extruded profile. Therefore, preference is given to the use of polymer systems having the same chemical base, but which have different hardening conditions to the polymer forming the extruded profile.

It is also possible that the nature of the polymer which has been moulded over the extruded profile is such that there is a good adhesion to the polymer constituting the joint, but problems in connection with the adhesion to the glass or enamel of the substrate. In this case, it may be advantageous to not completely remove the old profile, but leave a layer having a certain thickness in contact with the glass or enamel on which the moulded material can easily adhere.

In the case where the projection is to ensure a wider contact with the glass than that of the original profile, it may be necessary to carry out a special priming of the new glass or enamel surface intended to be in contact with the moulded material.

The materials compatible with the process according to the invention are in general all polymer systems provided for injection, to the extent that they ensure an adequate adhesion to the extruded profile already in place and possibly with the glass or enamel which they cover.

It is also advantageous that the polymers used have a very short setting time. Thus, for example, two-component polyurethane adhesives, hot melts, polymers for forming the cast or moulded layers, or thermoplastic polymers of different types may prove suitable. It is also important that the polymers adopted also have, in addition to the aforementioned properties, the same hardness, elasticity and appearance as adjacent in situ extruded profile portions. Thus, in the finished product it must in all cases be impossible or at least difficult to distinguish the transition between the extruded part and the subsequently moulded part.

When the profiled frame deposited by extrusion on the glazing is constituted by a one-component polyurethane system, which polymerizes under the influence of moisture, such as e.g. that described in U.S. Pat. No. 3,779,794, a composition which has proved suitable for the casting of an added part on the preceding profile is based on a reactive, one-component polyurethane system, which polymerizes by hardening under the action of heat. Such a material is commercially available under the reference SIKAFLEX 360 HC.

Hitherto, it was believed that a material of this type was only able to polymerize in a furnace with a flow of hot air and infrared heating with middle wavelength. It was therefore considered necessary for the surface of the material to be exposed to the atmosphere. During the tests which led to the invention, it has been found that polymerization can take place in a heated mould. It appears even that the hardening of the material in contact with the mould takes place particularly rapidly. From the performance standpoint, it is of interest to inject the material into an already preheated mould, because in this way at the start of the injection procedure the material has a viscosity which decreases enabling it to penetrate into the smallest unevennesses of the mould. This gives a moulded part having neither bubbles, nor deficiencies in remote areas.

At the end of the filling of the mould cavity, the heat-based polymer hardening process starts immediately. With a mould temperature of, for example, 140° C., the elastomer completely sets after one minute and at this moment the mould can be removed from the glazing.

The process according to the invention is not only usable for reconstituting the connection area between the start and finish of the profile desired on the periphery of a glazing, but also for any other correction at any point of the profile. Whenever the direct in situ extrusion causes a problem and the quality at a given location is not excellent, it is possible to start again by the above-described process to make the profile at such location.

Thus, for example, when a glazing equipped with a frame or frame portion has in one of its angles a pointed corner, where it is difficult to extrude a profile with a constant section, it is very easy to stop extrusion in said corner, or if it has already been produced to remove the profile after hardening, and to complete or repair it by casting the profile part.

In this way it is possible to obtain shapes, which could not be obtained by direct extrusion.

In the same way the added part obtained by casting can include foreign elements, which will thus be definitively fixed to the periphery of the glazing. These can be fitting elements such as shims, screws, hooks, etc. These elements are then used either for the fixing of the glazing in an opening, for example, of a car, or for fixing other objects such as, for example, a driving mirror or the support for an official rosette. However, the procedure according to the invention also makes it possible to directly integrate accessories on the periphery of the glazing. These will, for example, consist of signals, such as stop lights, electric power supplies such as for the heating of the glazing, antenna supplies, water or air ducts, passages for windshield wiper shafts, etc.

BRIEF DESCRIPTION OF THE DRAWINGS

FIG. 5 is a section along line V—V in FIG. 3;

FIG. 6 is a section of a variant of a detail of FIG. 4;

FIG. 7 is a perspective view of a variant of the mould for casting a rectilinear profile;

DETAILED DESCRIPTION OF THE INVENTION

Figure 1:
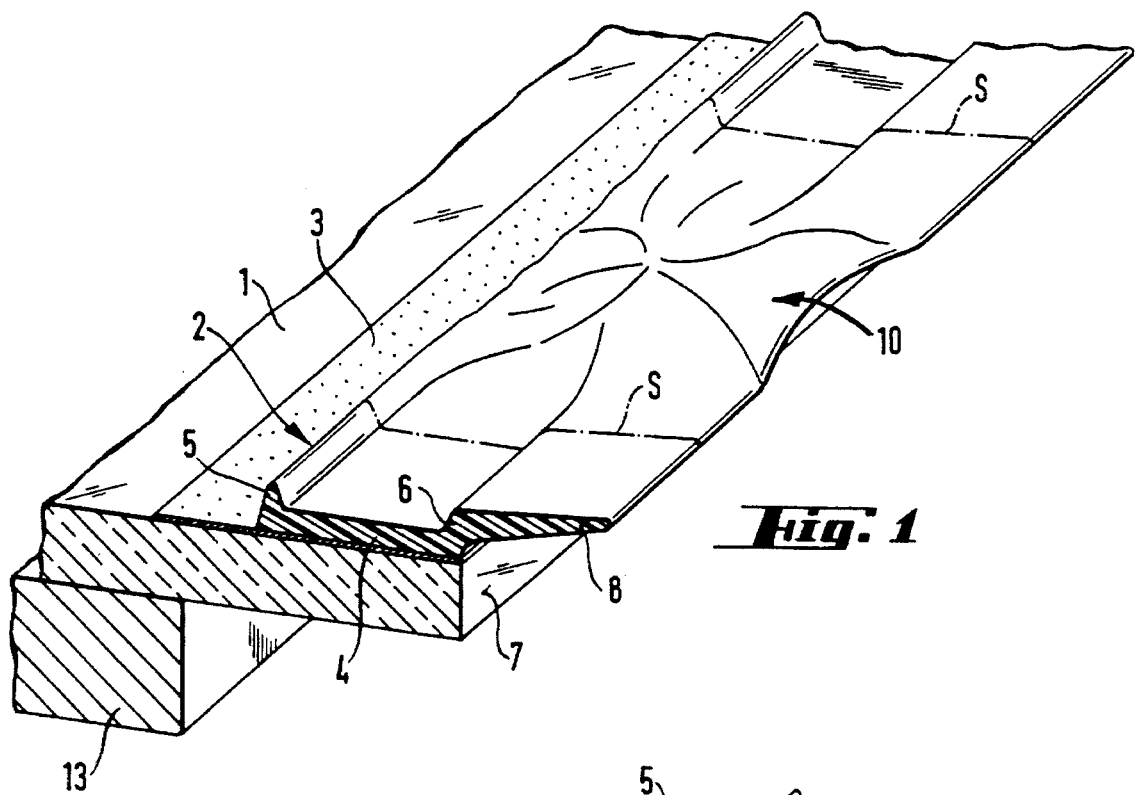
FIG. 1 is a perspective view of the connection area between the start and finish of an extruded profile such as is obtained from an extrusion process.
Figure 2:
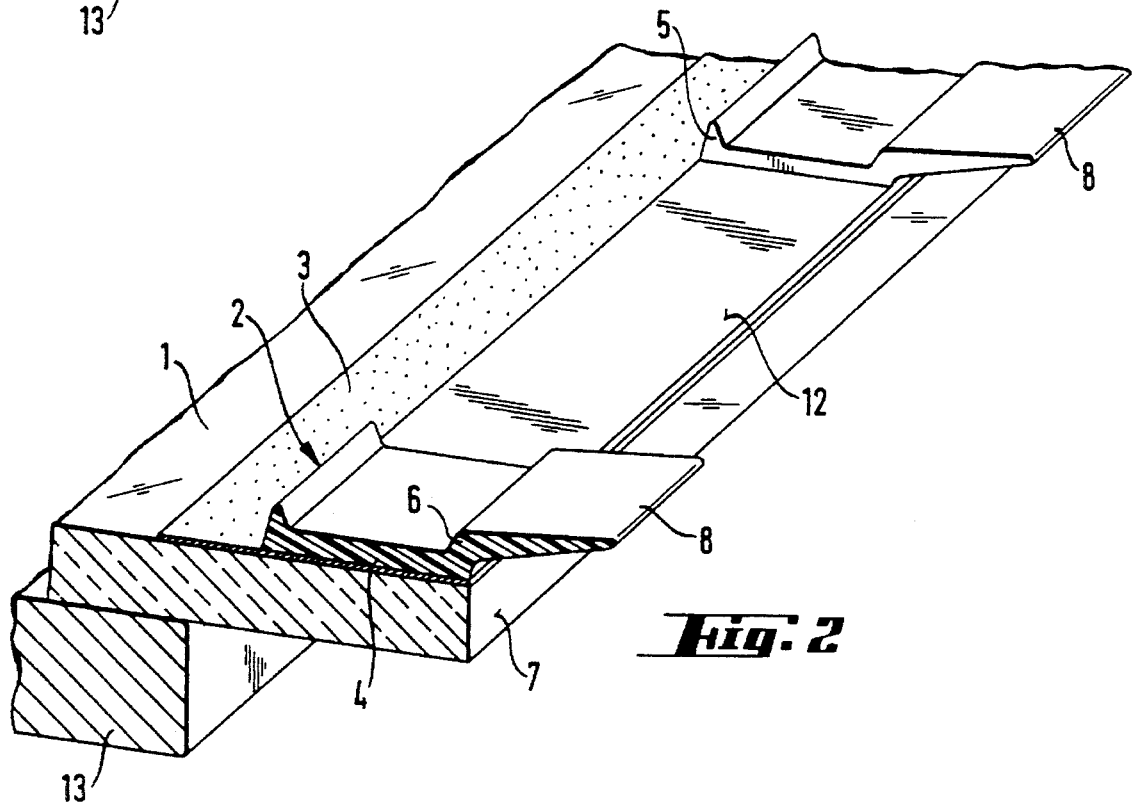
FIG. 2 is a perspective view of the same area of the glazing as in FIG. 1 after removing the profile.

In most of the drawings it is possible to see the edge of a glass plate 1 on the periphery of which has been extruded a profile 2. The glazing 1 is shown in the form of a monolithic plate. It is obvious that it could be both an insulating glazing constituted by unitary plates separated by an air space or a space for some other gas, or a laminated glazing like those used for producing car windshields.

Such glazings intended for use in cars are usually peripherally provided with an opaque enamel deposit in the form of a frame 3. The main function of this enamel is to protect the profile 2 against the action of ultraviolet rays, but it also makes it possible to hide all parts of the windshield fitting system. In the embodiments adopted, the profile 2 has a substantially U-shaped cross-section with a flat bottom 4 and two ribs for limiting the expansion of the adhesive at the time of installation, namely internal rib 5 and external rib 6. The external rib 6 is extended at right angles beyond the edge of the glazing 1 by a lip 8 substantially parallel to the glazing. During installation the said lip 8 bends and protects the edge of the glass at the time when the glazing is inserted in the car body opening. At the end of insertion the profile in the form of the lip 8 is used for cantering the glazing in the opening. In the finished car, said lip 8 connected to the body has an aesthetic function in that it masks the groove remaining between the glazing and the body.

The profile 2 is obtained by direct in situ extrusion on the periphery of the glazing 1. Extrusion takes place directly on the glass or on the layer 3, optionally following the interposing of one or more layers of an adhesion primer.

Such a process is, for example, described in U.S. Pat. No. 5,057,265. In the case where the profile 2 is deposited on the entire perimeter of the glazing 1, when the extrusion nozzle reaches the location where it started to make the deposit of the polymer on the glazing, it is raised from the glass. At this location and as shown in FIG. 1, there is an excrescence zone 10. In general, it is impossible to leave this zone in the state which it is in, particularly because the lip 8 is so deformed that it can no longer fulfill its function.

Means for improving the state of the excrescence zone when the polymer is still plastic have been described elsewhere. What is described here relates to a procedure following the hardening of the polymer. When the polymer has hardened sufficiently to enable the separation of the area in question without definitively deforming adjacent areas, the area in question is cut, which takes place in two phases. Firstly, the area or zone in question is separated from the remainder of the profile by making with a cutter two cutting lines S. In the second phase the entire deformed area is cut by a line substantially parallel to the glass surface. It is preferable for the second phase cut to take place at a certain distance from the glass, so as to leave on the surface a thin film of the old polymer, which will enable the new material to adhere to the profile-glass assembly.

The preceding operation can take place on the completely hardened polymer using tools such as planning devices, milling cutters, etc. The advantage of using a milling cutter is that the operation can take place automatically after the glazing has been positioned on a support 13 shown in FIG. 1.

In the case where casting is carried out by using a polymer having a good adhesion to the glass or the enamel layer covering it, it is possible to either completely remove the polymer from the profile 2 down to the glazing surface, not to cover the area, i.e., to stop extrusion before reaching the area of the connection.

After the glazing has been prepared in the aforementioned manner, a mould is deposited at the point in question and will be filled with an appropriate material for carrying out casting.

Figure 3:
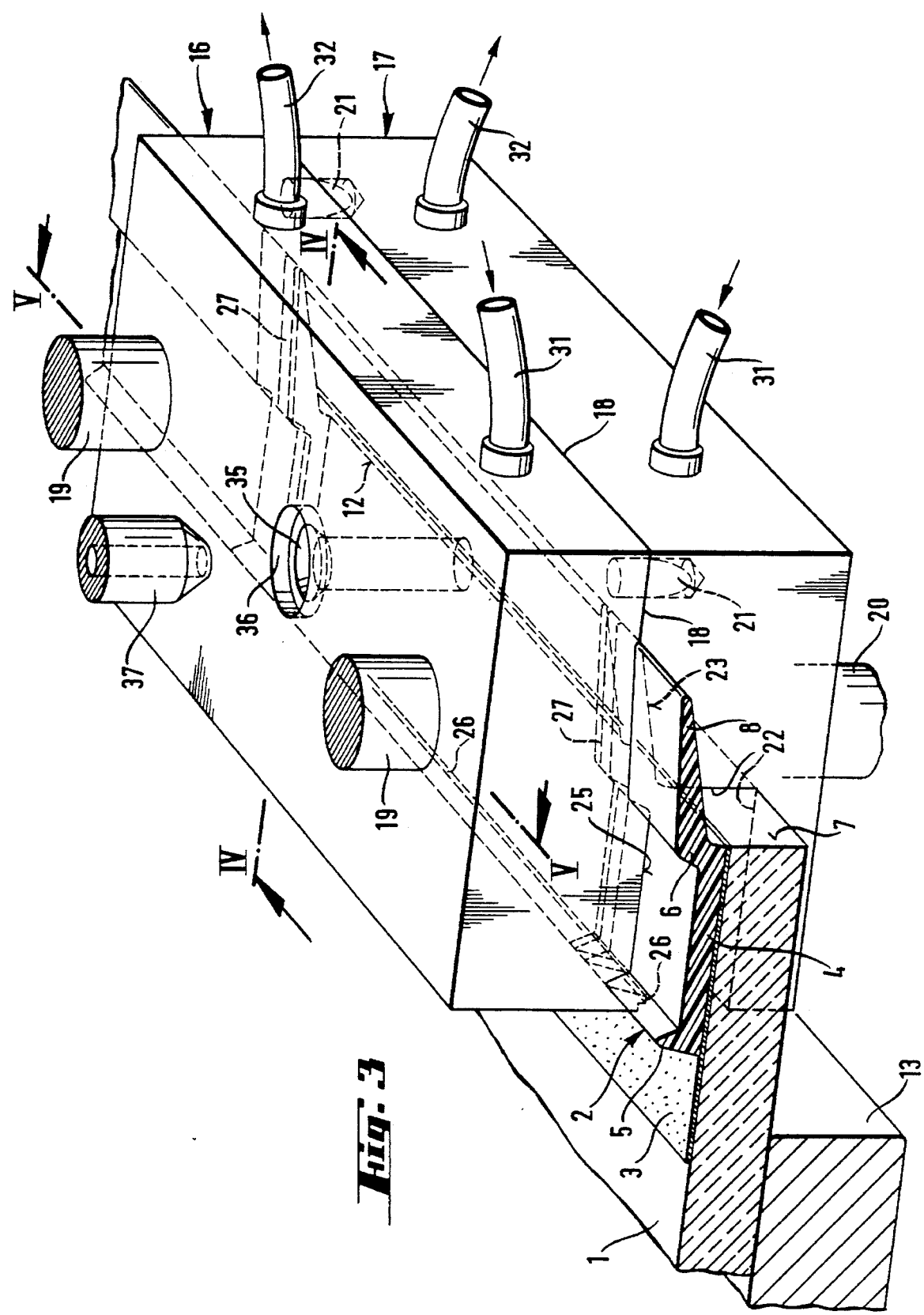
FIG. 3 is a perspective view of a mould for casting the transition area profile part.
Figure 4:
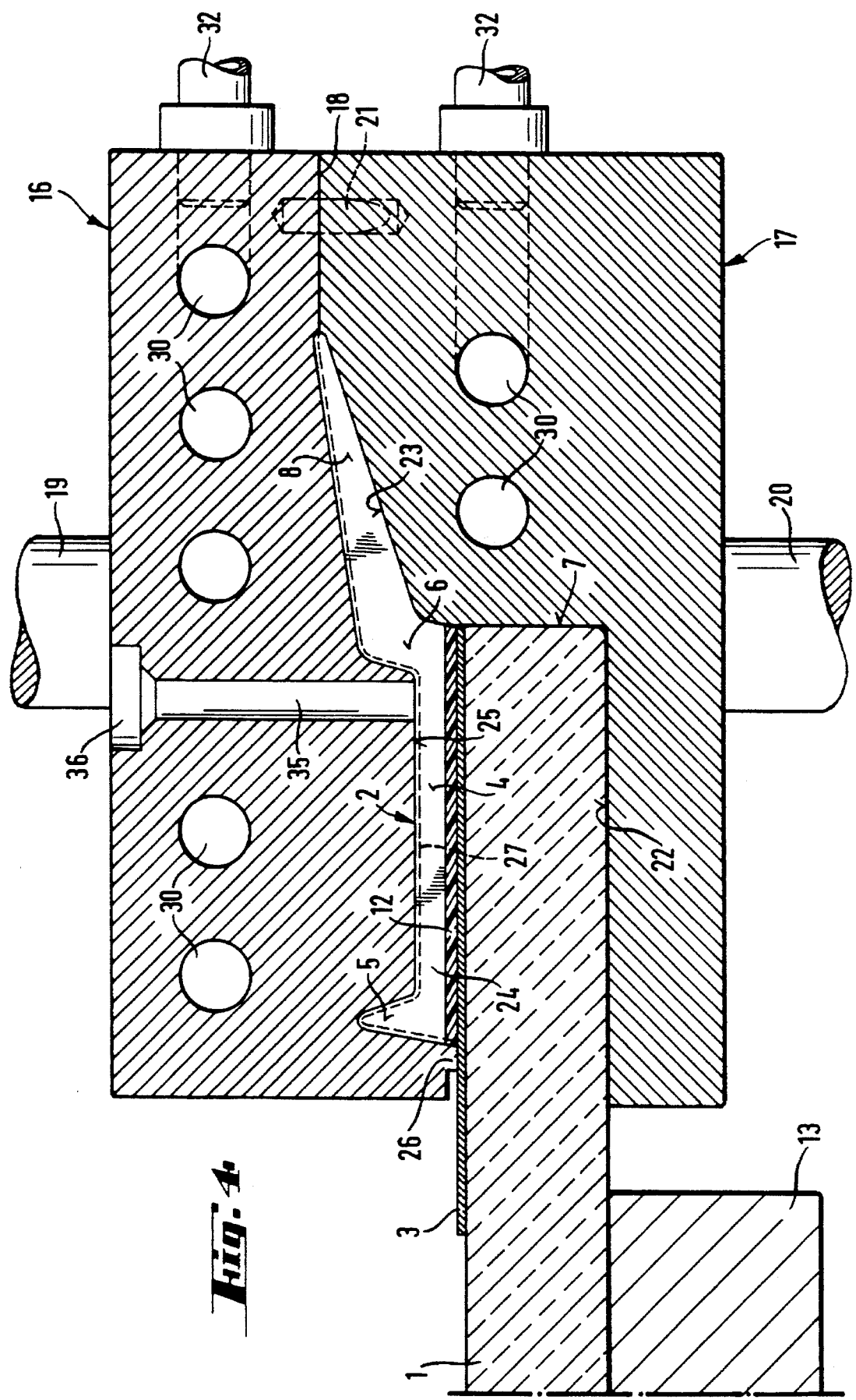
FIG. 4 is a section along line IV—IV in FIG. 3.

The mould shown in detail in FIGS. 3 and 5 is in two parts, namely an upper part 16 and a lower part 17. The separation zone 18 between the two is at the level of the lip 8. The upper part 16 and the lower part 17 of the mould are both fixed to appropriate supports 19, 20. As a result of mechanisms (not shown) these supports make it possible to place the two halves of the mould on the edge of the glazing at the desired time and then remove them at the end of the operation. The two mould halves are positioned precisely with respect to one another by means of centering lugs 21 and corresponding holes on the other half-mould.

While the lower half-mould has a setback area 22 for receiving the glazing 1 continued by the support of the lip 8 up to the separation zone 18, the upper half-mould 16 has a cavity 24, whose surface 25 corresponds to the upper part of the profile 2. Like the setback area 22, the cavity 24 extends into the lower half-mound 17 over the entire mould length, i.e., it issues to the outside. In this way, the profile 2, in the same way as the surface of the glazing, constitutes the limit of the mould.

In order to compensate for any tolerances on the profile 2 and/or thickness tolerances on the glazing, the upper part of the mould 16 has a simple longitudinal sealing slat 26 and a pair of perpendicular sealing slats 27 on its surface 25. The sealing slats 27 extend perpendicular to the length of the profile over the entire width of the surface 25 and are located in the cavity in such a way that they bear on the complete ends of the profile 2. Thus, they ensure a very good sealing at the limit of the cavity. Thus, they elastically deform the profile 2 which, as a result of a spring effect, ensures the necessary sealing. The longitudinal sealing slat 26 fulfills the same function in the other direction at the limit of the glass surface. It is positioned precisely at the limit of the lower layer 12, which is all that remains of the old profile and it directly presses on the glass or on the layer 3, if the latter is present.

The two halves of the mould 16, 17 are equipped with means enabling them to be heated in a controlled manner up to the chosen temperatures. They can, for example, be equipped with electrical resistors or thermometer probes, but it is also possible to use a heat transfer liquid. In this case, the two mould halves 16, 17 are provided with openings 30, to which are connected the pipes 31, 32 to enable the hot oil to circulate. A heating device is necessary in the case where the material used for the casting is a one-component polyurethane, which polymerizes with heat.

The upper mould 16 is provided with an injection hole 35, which widens at 36. When the upper half-mould 16 and lower half-mould 17 have been placed correctly on the edge of the glass, an injection nozzle is placed in the hole 36 and the mould cavity is filled with liquid polymer. It is important that immediately after the filling the injection nozzle is moved away from the mould to protect it against heat and therefore prevent hardening of the polymer within the nozzle. The two mould halves 16,17 remain in place for a sufficient time to ensure that under the action of the heat the polymer has hardened and until there is no longer any possibility of a deformation of the new moulded part.

FIG. 6 shows a modified embodiment of an element of the upper half-mould 16. Its purpose is to replace the longitudinal sealing slat 26, which is normally fixed with a mobile slat 40. The slat 40 makes it possible to compensate glazing thickness tolerances. It is placed between the wall of the half-mould 16 and a fixing plate 42, which is itself fixed to the mould by a screw 45. The slat 40 can move vertically and bears on the glass as a result of the action of the spring 41. However, its movement is limited by the lug 43, which is placed in the recess 44, which in particular limits its downward displacement when the upper half-mould is separated from the glass.

It is obvious that, if necessary, the surfaces of the mould cavities can be provided with layers preventing the adhesion of the material to be cast and facilitating removal of the mould. Moreover, the surfaces of the cavities can be treated in different ways to give them a structure making it possible to precisely obtain the same surface appearance as that of the profile obtained by extrusion. This can consist of polishing, chemical etching, sandblasting, etc.

During the performance of the process according to the invention, a treatment with polytetrafluorethylene (PTFE) gives a good surface appearance and also permits easy removal of the mould.

Depending on the nature of the polymer used for the casting, it may be necessary to treat the surface both of the profile 2 and of the glass or even the enamel layer with a suitable primer. Instead of using upper and lower half-moulds in one piece, in the manner described above, it is also possible to equip the moulds with their own temperature regulating, positioning and other systems having various different shapes and adapted to the shapes of the profiles which it is wished to produce and which can be very rapidly changed.

The apparatus described above can also be used for a thermoplastic polymer. In this case, the openings 30 of the two half-moulds 16, 17 are used for bringing about the circulation of a cooling liquid instead of a heating liquid. Thus, it is possible to obtain a rapid setting of the thermoplastic.

In certain cases, it may be of interest to provide the mould with complementary devices, like those shown in FIG. 7. More particularly in the car industry, as a function of the particular car type, it often occurs that the length of the lip 8 is not the same for the different glazings equipping a car. Conversely, the other parts of the profile 2 are generally identical. It can therefore be of interest to be able to adjust the length of the lip 8 as a function of the glazing which it is wished to treat.

Another reason which can make necessary the regulation of the position of the end of the lip 8 is the production tolerances in connection with the extruded joint. The apparatus according to FIG. 7 must on all occasions allow a good transition with the existing joint.

Here again the contour of the half-mould 47 follows the lower edge of the glazing, the side of the glazing and the lower part of the lip 8, 49. This part is extended by a planar surface 50 on which can slide a sliding plate 51. The thickness of the plate 51 corresponds to the thickness of the lip 8 in its terminal portion. The front end 52 of the sliding plate 51 constitutes the limit of the mould corresponding to the edge of the lip 8. The upper half-mould 53 corresponds exactly to what has been described up to now and it rests by its planar surface 54 on the upper portion of the sliding plate 51.

To the exterior of the mould, the sliding plate 51 is held in jaws 57, 58. The lower jaw 57 slides on the surface 59 of the lower half-mould 47 and is terminated by a fork-shaped member 60. The fork 60 makes it possible to keep in place the assembly of the jaws and the sliding plate 51 due to a washer 61 controlled by the rod 62 of the jack 63.

The apparatus is operated in the following way. Firstly the lower half-mould 47 is put into place. For this purpose the surface 48 is engaged on the lower face of the glazing and the vertical bearing surface is placed on the edge of the glass. As the jack 63 is free, either manually, or automatically, the sliding plate 51 is brought into contact with the edge of the lip 8 on either side of the area to be treated. The sliding plate 51 moves in the two directions of the plane. The following operation consists of acting on the jack 63, so as to fix the position of the sliding plate 51 relative to the lower portion of the mould 47. The upper portion 53 of the mould is then precisely positioned with reference to the lower part 47. The mould is now closed and injection can take place through the injection hole 35.

Figure 8:
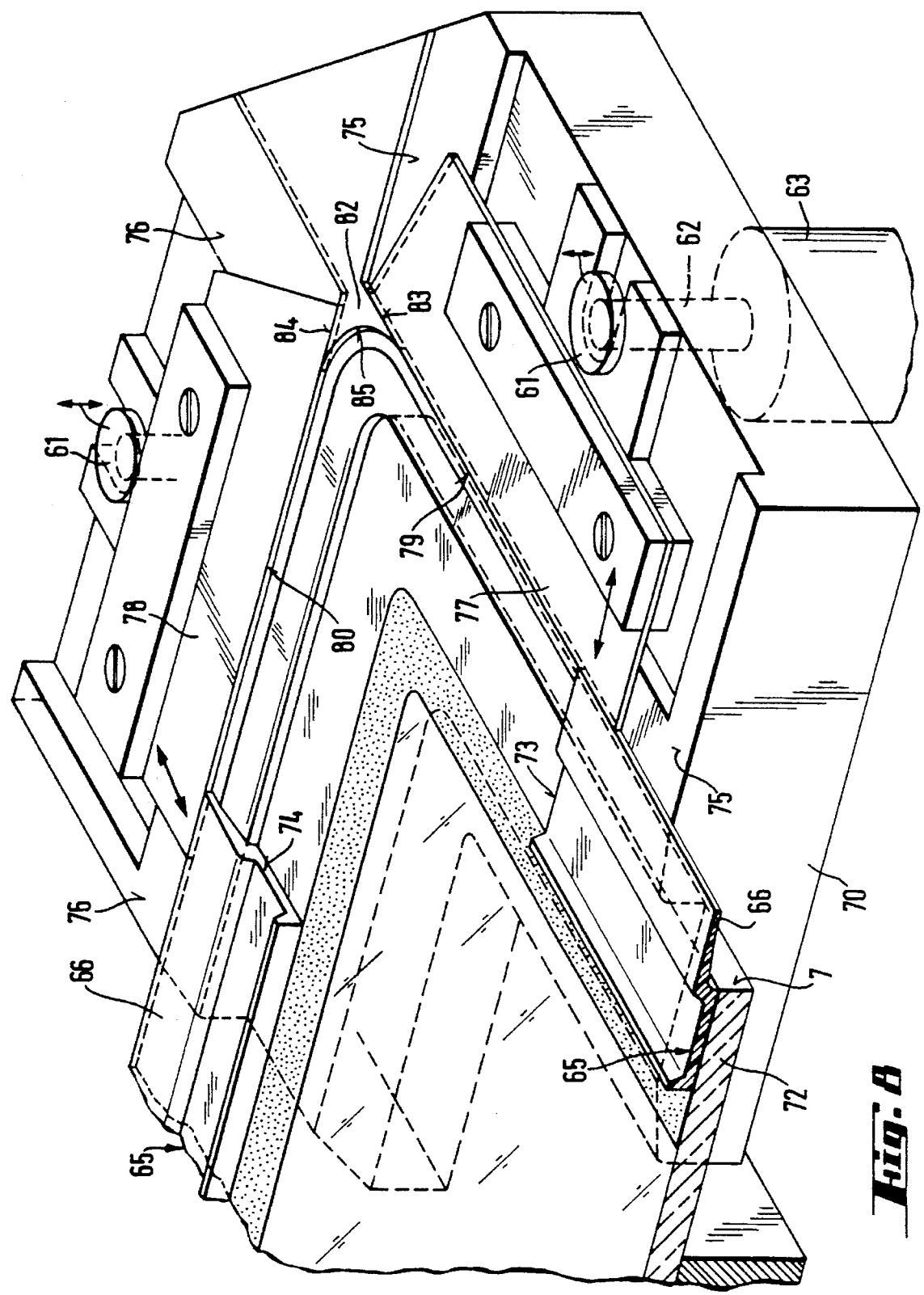
FIG. 8 is a perspective view of a mould for producing a corner profile, showing the lower part of the mould.

The principle of the inventive process described above in connection with FIG. 7 for part of the rectilinear profiles is also usable in the angles. This is often necessary, because it is impossible to deal with very tight corners with extrusion nozzles and it is consequently impossible to follow a sharp edge of the glazing. Moreover, in those parts of the glazing with very small radii of curvature, the peripheral lip is very difficult to obtain by extrusion. Thus, it is necessary to very accurately dose the respective quantities injected into the interior and the exterior of the curve and often a scallop-shaped lip 8 is obtained. Therefore, in this case, it is necessary to completely regenerate the joint in the corner. For this purpose, and as shown in FIG. 8, use is made of a lower half-mould 70 and an upper half-mould 71, which are in each case adapted to the corner of the glazing 72. In this case the profiles 65 and 66 have been retained in their rectilinear portions and the curved portion of the corner has been cut in accordance with the lines 73 and 74.

On the lower half-mould 70 at the lower limit of the lip 66, two planar sliding surfaces 75, 76 are provided. On the surface 75 a sliding plate 77 is disposed and on the surface 76 a sliding plate 78. Both plates can slide on their respective surfaces. The edges 79, 80 of the plates 77, 78, respectively, again form the limits of the lip 66.

The actual corner area of the lip 66 is limited by means of a fixed plate located at the same height as the sliding plates 77, 78. The cut plate 82 has a contour 85 limiting the corner of the lip 66 and has bearing surfaces 83, 84. As in the preceding embodiment, the sliding plates 77, 78 move in the two directions of the plane. They can therefore bear at one of their ends on the edge of the lip 66 and at the other end on one of the two bearing surfaces 83, 84, thus ensuring the continuity of the edge of the lip 66. The fixing of the sliding plates 77, 78 following their precise positioning takes place in the same way as in FIG. 7 by means of jacks, which engage the jaws on the lower portion of the mould.

Figure 9:
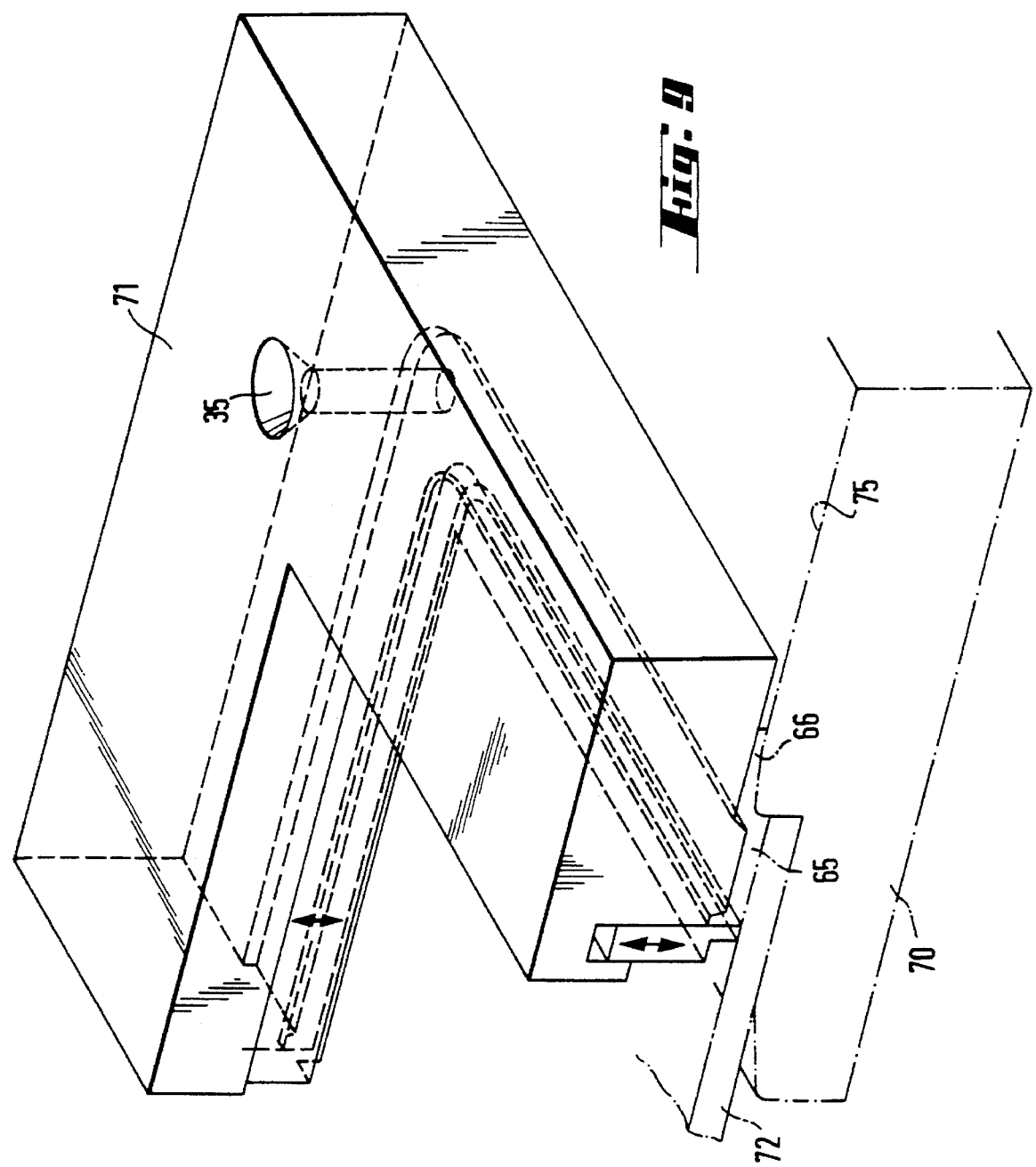
FIG. 9 is a detail of the upper part of the mould of FIG. 8.

FIG. 9 shows the upper portion of the corner mould for assembly with the lower portion described above. The upper portion also has an injection orifice 35.

Figure 10:
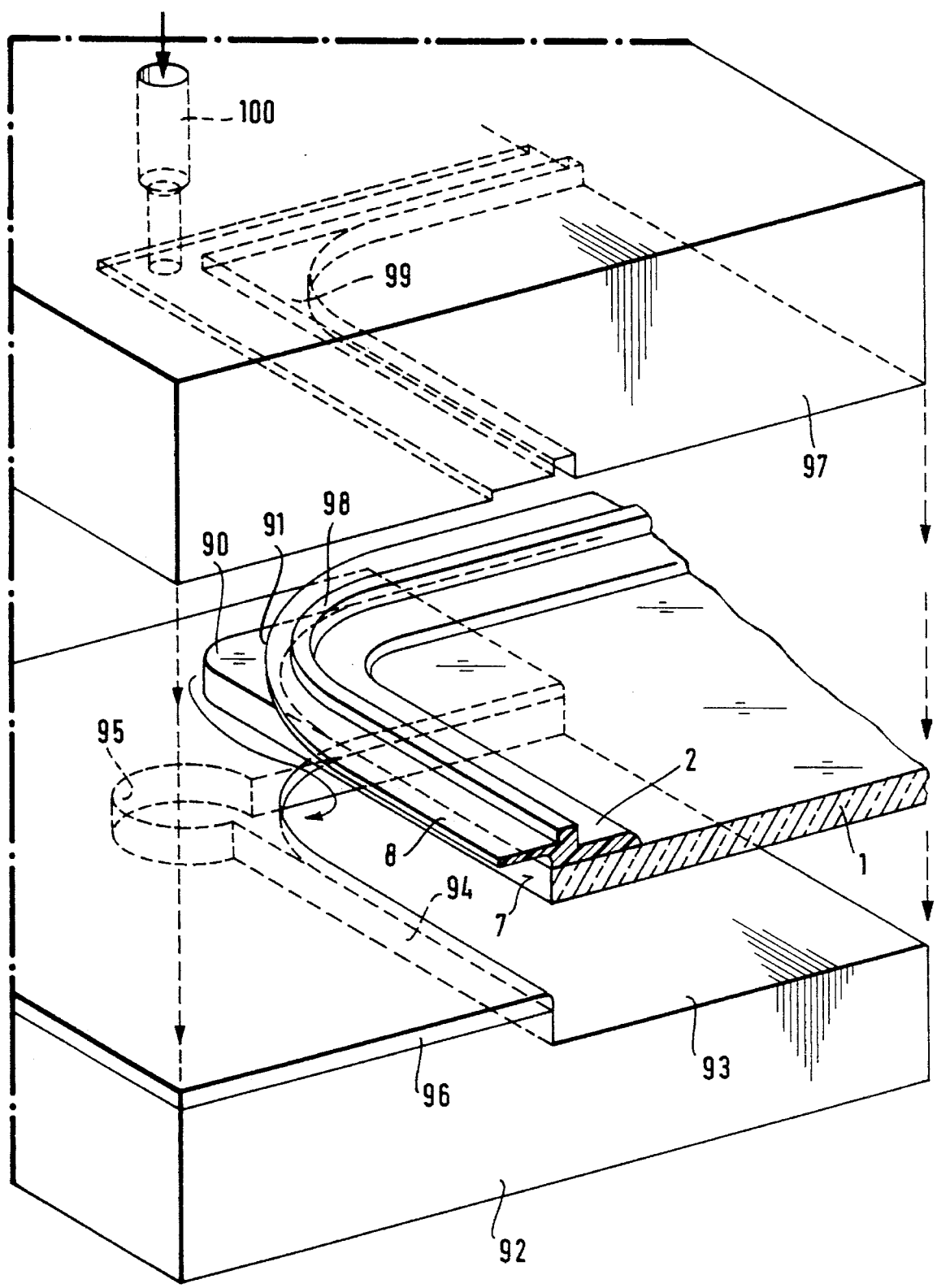
FIG. 10 is a perspective view of two parts of a mould for bringing about the grafting of the joint to the corner of a glazing.

FIG. 10 shows a variant of the invention, where an added part is cast on an extruded profile which has remained in place. This procedure is of particular interest in two cases: firstly, when it is necessary to give the joint at certain locations, particularly the corners, a shape which is very difficult or impossible to obtain by extrusion only and, secondly, when it is wished to add to the glazing new functions by means of an elastomer complement, which is grafted on the extruded joint at the periphery of the glazing. It is, for example, a question of integrating an electrical connector for the heating of the rear window or windshield of a car, or the complement serves to receive the windshield wiper spindle for the rear window.

FIG. 10 illustrates a case which is very difficult to bring about by the mere in situ extrusion of the peripheral joint. The right angle of a glazing, when it is wished that the lip ensuring the centering of the glazing and which has a very important aesthetic function by masking the space left between the glazing and the periphery of the opening also forms an angle of exactly 90°. It is a second method, which is different and simpler than that illustrated by FIG. 8. Thus, there is no ablation of the joint in the area in question and the new complement is merely grafted on the joint as it is.

FIG. 10 shows the glazing 1 with its edge 7 and the extruded joint 2 with its lip 8. The glazing 1 has at 90 a 90° angle with a very small radius of curvature. The joint 2 has been deposited without using a regulatable supply nozzle such as is e.g. described in U.S. Pat. No. 5,108,526. Thus, in the glazing area, if the interior of the curve has been correctly supplied, material is missing on the outer part on the lip 91. In order to cast this deficient joint, use is made of the special mould shown in the drawing. The lower half-mould 92 has a flat recess 93 bounded by an angle iron 94. In the corner of the latter a hole 95 prevents tolerance problems from disturbing the positioning of the glazing edge 7 as it bears on the angle iron 94.

The upper portion of the lower half-mould 92 is provided with a mould bottom plate 96 following the lower portion of the joint and which therefore covers the corner of the glazing when referenced on the angle iron.

The upper half-mould 97 adopts the shape of the upper portion of the joint 2, namely where it is rectilinear. This also applies with respect to the interior 98 of the curve part of the joint 2, but on the exterior, the cavity 99 of the upper portion 97 of the mould has the shape which it is wished to give to the complement. It is in this zone where the injection orifice 100 is located.

Figure 11:
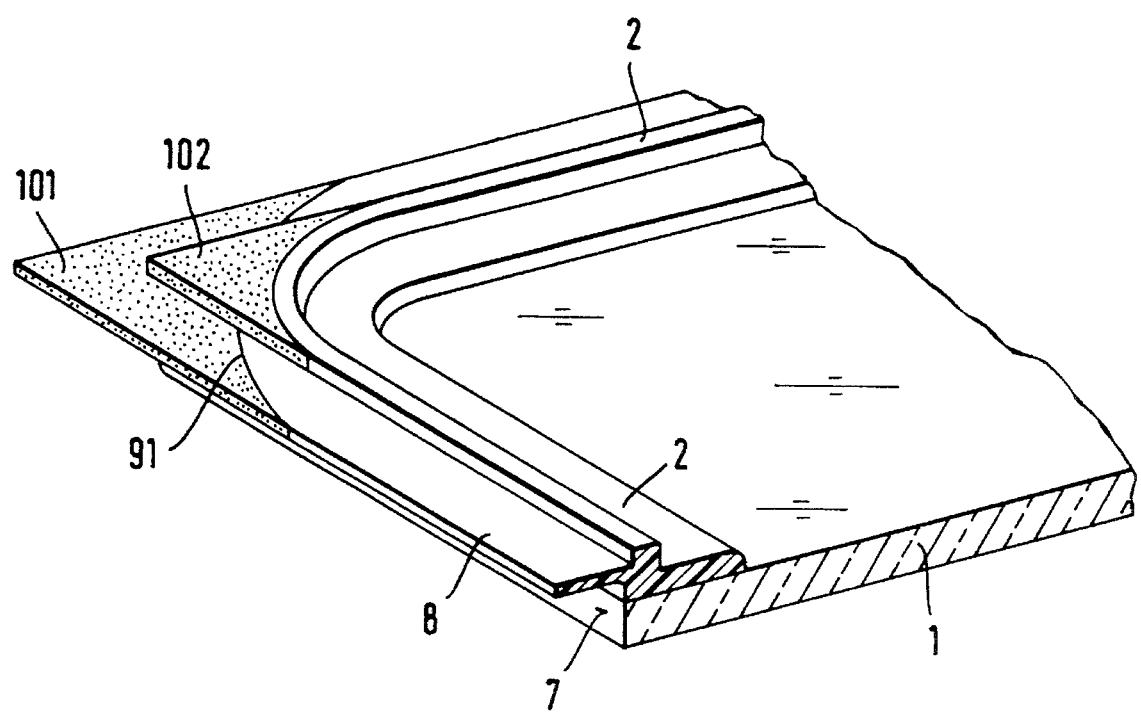
FIG. 11 is a perspective view of the glazing equipped with its modified joint.

The apparatus described above makes it possible to produce the glazing joint shown in FIG. 11, where the extruded portions are shown white and the complement, joined by casting, in grey with a right-angled lip 101 and a reinforcing part 102 following the central rib of the profile 2.

The "grafting" procedure described above can have the same regulating, adjusting, heating or cooling system as described in connection with FIGS. 3 to 9.

We claim:

1. A process for providing a profile obtained by in situ extrusion of a polymer on a glazing periphery, wherein the glazing is optionally coated with an opaque layer, said profile having a first and a second side, with a moulded polymer part having a clearly defined shape and connected to at least one of said sides of the profile, comprising;

a) placing at least one mould member into place, wherein said mould member bears on the glazing and contacts the profile; and b) injecting into the mould member a hardenable material to mould a polymer part which adheres at least to the polymer of the extruded profile.

2. The process according to claim 1, further comprising the step of:

a) removing all or part of the extruded profile at a desired location of the mould member before putting the mould member in place.

3. The process according to claim 2, wherein:

a) the extruded profile is removed before hardening of the extruded polymer is complete.

4. The process according to claim 2 wherein:

a) the extruded profile is removed after its hardening.

5. The process according to any of the claims 2 to 4, wherein:

a) during the removal of the profile at the location of the mould member, a portion of the extruded profile in contact with the glass or the opaque layer is left in place.

6. The process according to any one of claims 2 to 4, wherein:

a) the glazing is one which is to be used for equipping a car opening and the profile is intended to participate in fixing the glazing in said opening by bonding.

7. The process according to claim 6, wherein:

a) the polymer part includes one or more foreign elements for ensuring a function other than that of the profile.

8. The process according to any of the claims 2 to 4, wherein:

a) the polymer used for the in situ extrusion is a one-component polyurethane polymerizing with atmospheric humidity or a two-component polyurethane; and b) the hardenable material is based on a one-component polyurethane, which is transformed into an elastomer by exposure to heat.

* * * * *